United States Patent
Kuo et al.

(10) Patent No.: US 6,674,921 B1
(45) Date of Patent: Jan. 6, 2004

(54) METHOD OF IMAGE SAMPLING AND APPARATUS THEREOF

(75) Inventors: Shih-Zheng Kuo, Taipei (TW); Shih-Huang Chen, Hsinchu (TW)

(73) Assignee: Umax Data Systems Inc., Hsinchu (TW)

( * ) Notice: Subject to any disclaimer, the term of this patent is extended or adjusted under 35 U.S.C. 154(b) by 678 days.

(21) Appl. No.: 09/628,047

(22) Filed: Jul. 28, 2000

(30) Foreign Application Priority Data

Sep. 30, 1999 (TW) ........................................ 88116783 A

(51) Int. Cl.$^7$ ................................................. G06K 9/32
(52) U.S. Cl. ........................ 382/299; 358/1.9; 348/620; 708/710; 708/835
(58) Field of Search ................................ 382/299, 261, 382/254, 276; 358/1.1, 1.9, 468, 3.01, 504, 500, 443; 348/620, 619, 618, 607, 571; 347/238, 252, 224, 225, 251, 233; 708/710, 501, 835

(56) References Cited

U.S. PATENT DOCUMENTS 5,493,339 A * 2/1996 Birch et al. ................. 348/461
6,075,236 A * 6/2000 Lamproye et al. ....... 250/208.1

\* cited by examiner

*Primary Examiner*—Jayanti K. Patel
*Assistant Examiner*—Sheela Chawan
(74) *Attorney, Agent, or Firm*—Rabin & Berdo, P.C.

(57) ABSTRACT

A method of image sampling and an apparatus thereof. The apparatus comprises: an adder; a first register, the output of which is fed back to the adder; a first multiplexer, which outputs a ratio or a weighted parameter; a multiplier, which receives an input image value and the output of the first multiplexer; an adder/subtracter, which receives the output of the multiplier; a second multiplexer, which receives the output of the adder/subtracter and the multiplier; and a second register, which receives the output of the second multiplexer. By the method of approximation and recursion, the input image data can be processed in real time to produce the output image data.

21 Claims, 4 Drawing Sheets

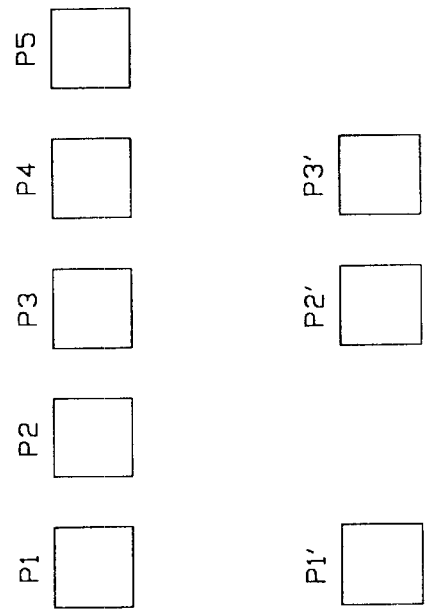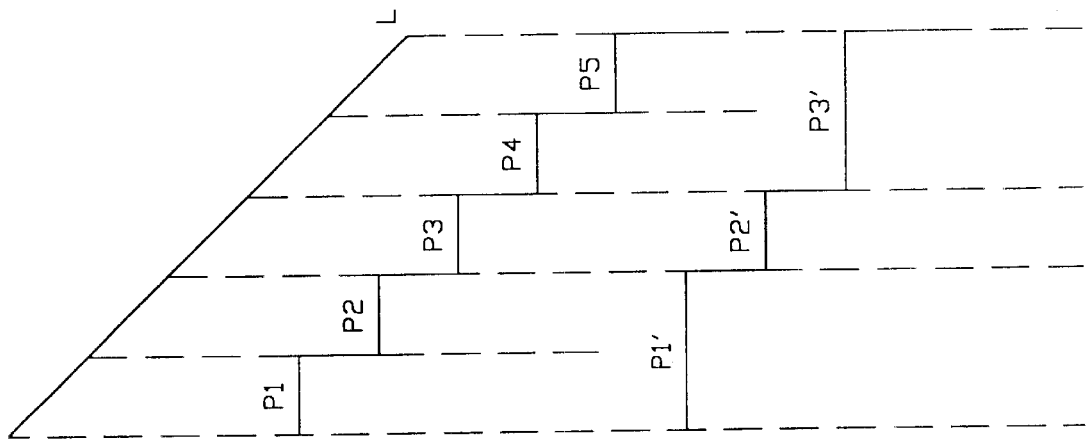
Fig.1a
Fig.1b
Fig.1c

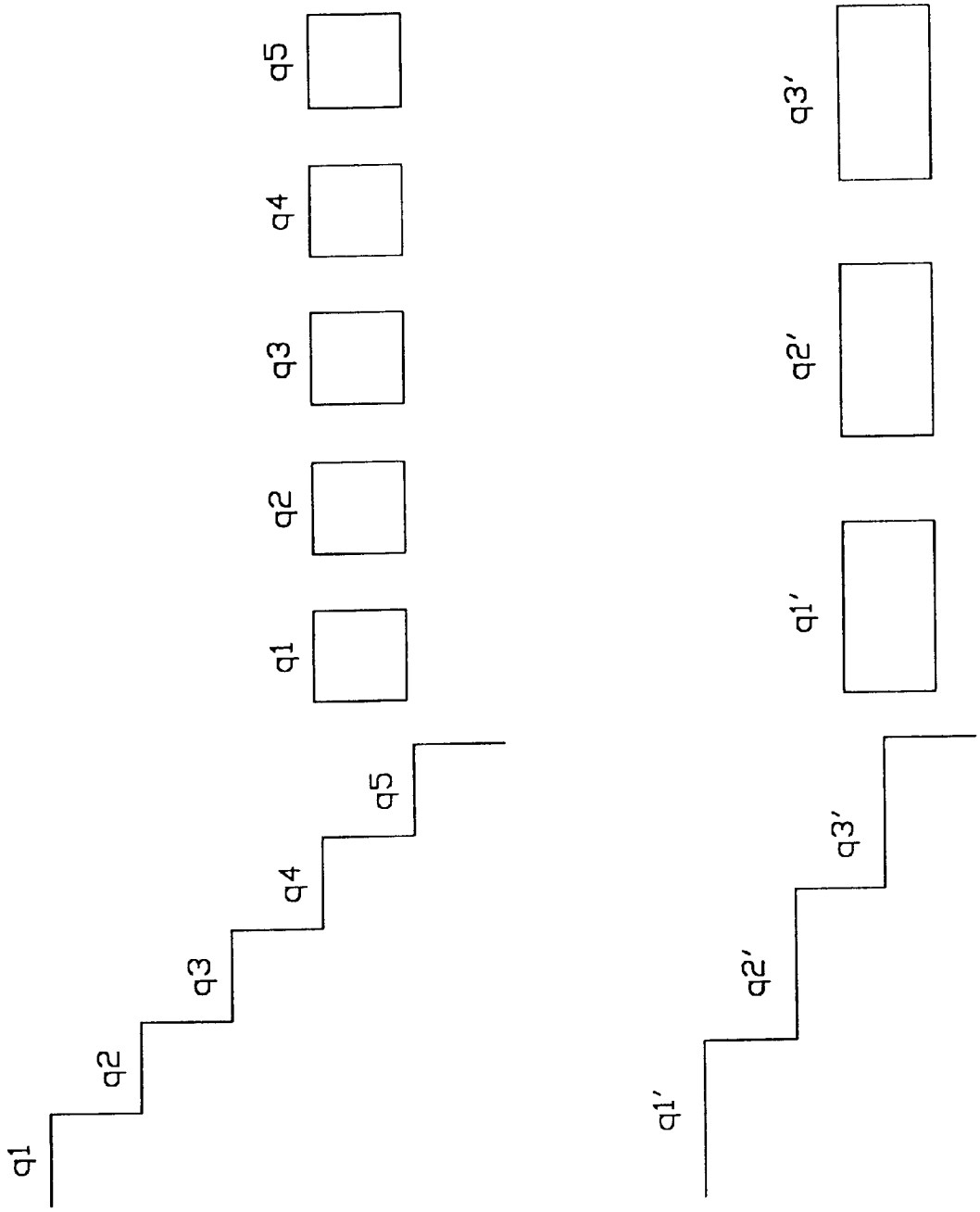

METHOD OF IMAGE SAMPLING AND APPARATUS THEREOF

BACKGROUND OF THE INVENTION

This application incorporates by reference Taiwanese application Serial No. 88116783, Filed Sep. 30, 1999.

1. Field of the Invention

The invention relates in general to a method of image sampling and an apparatus thereof, and more particularly to a method of sampling input image data of a digital image system in accordance with the methodology of approximation and recursion and an apparatus thereof.

2. Description of the Related Art

In the early stage of information technology, information is represented in text only. As information technology progresses, multi-media are becoming the general requirement to data users, especially PC users nowadays. The multi-media mean that forms of data in transmission include images and voice other than text. Therefore, many kinds of digital image scan systems have been developed in order to process a variety of image data. Scanners and digital cameras are the most popular digital image scan systems. In the following description, scanners are taken as an example and digital cameras can be inferred.

The resolution of common scanners is 300 dpi (dot per inch), 600 dpi, or 1200 dpi. Some scanners provide kinds of resolution for selection. For example, users can select formal resolution to scan complicated images to obtain better image quality. On the other hand, users can select lower resolution to scan simple images to save image scan time. Here the lower resolution of the two is defined as "non-optical resolution".

However, when the non-optical resolution is selected, how to sample is an important factor that will affect the quality of images to be scanned. Common scanners with several kinds of resolution use the method of "skipping points directly" to obtain non-optical resolution images. The method of "skipping points directly" and the advantages thereof are further described in the following.

Referring to FIGS. 1a, 1b, and 1c, in order to make the description simple and explicit, a sloped straight line is taken as an example of an input image. Although the real situation is much more complicated than the straight line image, the concept can be applied similarly. FIG. 1a shows a sloped straight line L representing the input image. FIG. 1b shows partial results of scanning with formal resolution (for example, 1200 dpi), and FIG. 1c shows partial results of scanning by using the non-optical resolution (for example, 720 dpi). In FIG. 1b, points p1~p5 represent five successive points (or called image data) sampled along the straight line L with the formal resolution 1200 dpi.

Points p1'~p3' in FIG. 1c are the results of skipping the points p2 and p4. A non-optical resolution image is obtained by directly skipping some points of an original image with the formal resolution. After the skipping, the image resolution can be lowered to the non-optical resolution.

However, in FIG. 1c, a disadvantage of aforementioned image sampling with non-optical resolution can be observed, which is a non-uniform saw-toothed pattern of the sampled image. Generally, a scanner accomplishes the process of "skipping points directly" by the following steps. The sampled image data with formal resolution are firstly stored in storage media such as hardware in a PC. Then, the image data in the storage media are read. At last some of the image data are omitted by using an algorithm.

To sum up, conventional scanners with various kinds of resolution have two kinds of disadvantages as follows as the non-optical resolution is requested:

(1) The scanning quality is low, because the method of "skipping points directly" causes an obvious saw-toothed pattern of the sampled image.

(2) Using the additional algorithm to skip points in image increases the processing time and cost as a whole.

SUMMARY OF THE INVENTION

It is therefore a primary object of the invention to provide a method of image sampling and an apparatus thereof. It can be applied in a digital image scan system. According to the method of image sampling and the apparatus thereof, a smooth scan curve can be obtained with the non-optical resolution. Also, the invention is performed in real time, which will shorten the processing time largely.

In order to accomplish the object of the invention, the invention provides an apparatus of image sampling, which is mounted in a digital image scan system. The apparatus samples an input image to produce a sequence of input image data. The digital image scan system provides a first parameter.

The apparatus of image sampling includes an adder, for receiving the first parameter and a second parameter to produce a carry bit and a sum; a first register, for receiving the sum and outputting the second parameter that feedbacks the adder; a first multiplexer, for outputting the first or the second parameter under the control of the carry bit; a multiplier, for receiving one in the sequence of input image data and the output of the first multiplexer to output a third parameter; an adder/subtracter, for doing addition or subtraction of the third parameter and a fourth parameter to output a fifth parameter under the control of the carry bit; a second multiplexer, for outputting the third or the fifth parameter under the control of the carry bit; a second register, for receiving the output of the second multiplexer and outputting the fourth parameter; and a divider, for receiving the output of the adder/subtracter to produce one of output image data under the control of the carry bit.

Additionally, the invention provides a method of image sampling which is applied in a digital image scan system. The digital image scan system provides a first parameter and samples an input image to produce a sequence of input image data. The method of image sampling includes steps as follows: First, initial values of a second parameter and a third parameter are given. Second, the second parameter is replaced by the sum of the first and the second parameters. A product of one in the sequence of input image data and the first parameter is obtained and set to be a fourth parameter. Next, the third parameter is replaced by the sum of the third and the fourth parameter. When the second parameter is larger than one, the product of the input image data and the second parameter is set to be a fifth parameter and the result of the third, parameter subtracted by the fifth parameter be one of output image data. Also, the third parameter is replaced by the fifth parameter. At last the method goes back to the second step.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 1a is a to-be-scan image curve;

FIG. 1b shows the scan curve of scanning the image curve in FIG. 1a with formal resolution in the prior art;

FIG. 1c shows the scan curve of scanning the image curve in FIG. 1a with non-optical resolution according to the conventional method;

FIGS. 4a and 4b show the scan curves of scanning the image curve in FIG. 1a with formal and non-optical resolution according to a preferred embodiment of the invention.

DESCRIPTION OF THE PREFERRED EMBODIMENT

According to a preferred embodiment of the invention, a smooth scan curve with non-optical resolution is obtained by the concept of approximation, and image data are processed by the method of recursion.

The method of approximation in the invention is to approximate the required non-optical resolution image by the image data obtained with formal resolution. The non-optical resolution image data are obtained as follows:

$$N = \sum_{i=1}^{k} w_i[a_i], \text{ wherein } \sum_{i=1}^{k} w_i = 1 \qquad \text{Eq.(1)}$$

wherein n denotes one of the output image data sampled by the method of approximation, $a_i(i=1\sim k)$ are the output image data sampled with the formal resolution, and $w_i$ are the corresponding weighed parameters of the image data $a_i$. For the convenience of discussion, the formal resolution and the non-optical resolution are supposed to be 1200 dpi and 720 dpi respectively.

For 720:1200=3:5, in the embodiment, five image points a1~a5 are used to obtain the three output image points n1~n3 by the method of approximation. The values of points n1~n3 are respectively:

$n1=(3/5)*a1+(2/5)*a2$      Eq.(2)

$n2=(1/5)*a2+(3/5)*a3+(1/5)*a4$      Eq.(3)

$n3=(2/5)*a4+(3/5)*a5$      Eq.(4)

Above equations are given when the number k is 3. However, the calculation will become complicated when the number k is quite larger. To simplify the above calculation, Eqs.(2), (3), and (4) can be further adjusted as Eqs.(5) and (6), wherein the weighed parameters $w_i$ are set to be the same value 3/5 first, and then the redundant parts are reduced.

$n1=[(3/5)*a1+(3/5)*a2]-(1/5)*a2$      Eq.(5)

$n2=(1/5)*a2+[(3/5)*a3+(3/5)*a4]-(2/5)*a4$      Eq.(6)

wherein $(1/5)*a2$ and $(2/5)*a4$ are the redundant parts of n1 and n2 respectively. However, from Eqs.(4), (5), and (6), it can be observed that the redundant part $(1/5)*a2$ can be used to calculate the next image data n2, and the redundant part $(2/5)*a4$ can be also used to calculate the following image data n3. This rule simplifies the algorithm in image sampling.

Figure 2:
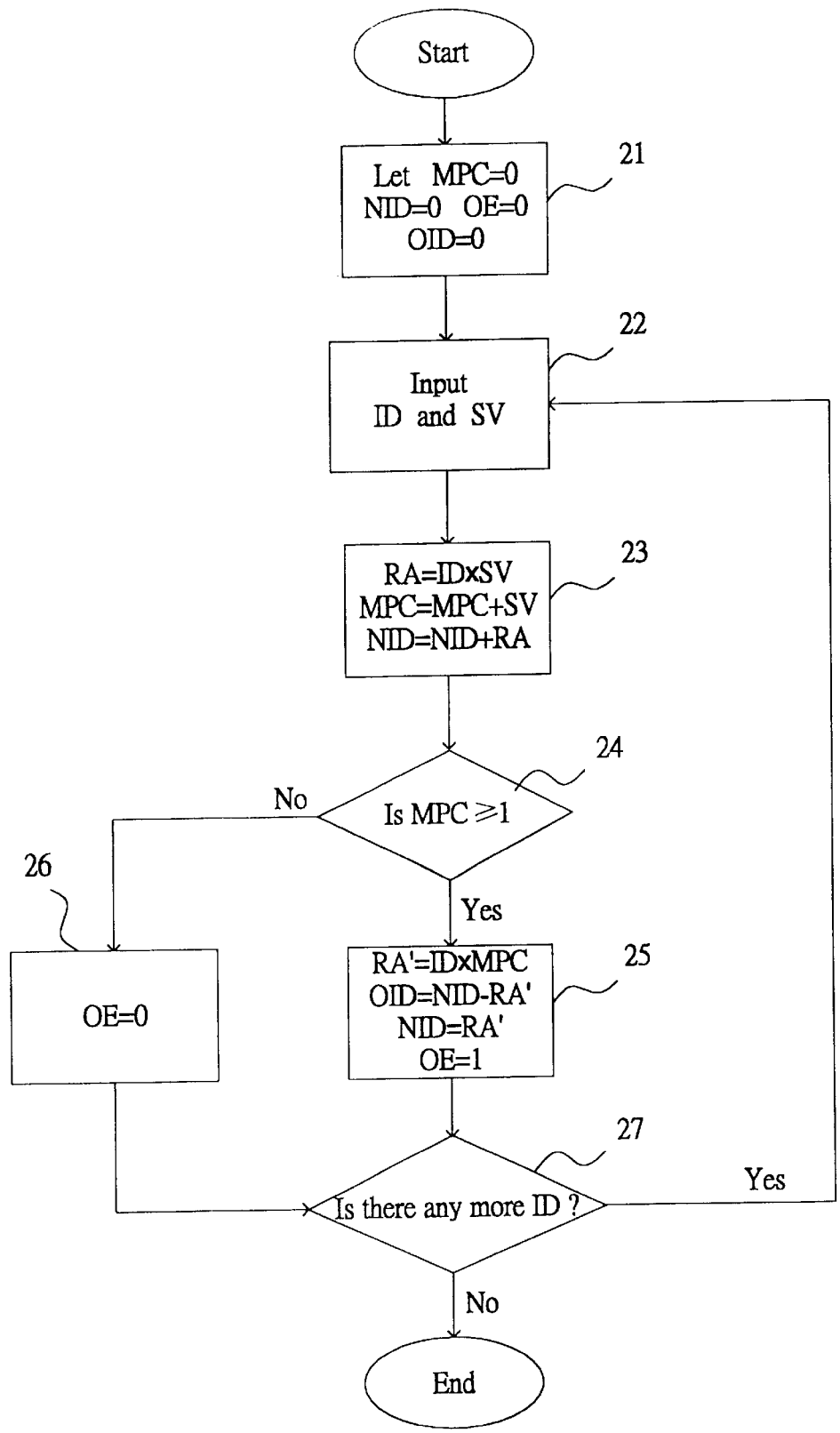
FIG. 2 is a block diagram showing method of image sampling according to a preferred embodiment of the invention.

Referring to FIG. 2 which is a block diagram showing a method of image sampling according to a preferred embodiment of the invention. First, the initial values of parameters MPC, NID, OE, and OID are all set to be 0 as step 21. The parameter MPC is a mapping pixel count for deciding whether the sum of all weighed parameters $w_i$ is larger than 1. The parameter NID is one of the new image data, and the parameter OID is one of the output image data which is one value of n1~n3 in Eqs.(2)~(4). The parameter OE is an output enable with the value 0 or 1. When the value OE is 1, it represents the needed output image data are obtained and output. When the value OE is 0, it represents the required output image data are not found.

Next, the image data ID and the scaled value SV are input as step 22. The image data ID are the values $a_i$ mentioned above. The scaled value SV denotes the ratio of the non-optical resolution divided by the formal resolution, such as 720/1200=3/5 in the embodiment. The value SV is generally provided by the scanner.

Formulas RA=ID*SV, MPC=MPC+SV, and NID=NID+RA are worked out at step 23. The parameter RA is referred as the quantity of each input image data ID in each output image data OID, such as the value (3/5)*a1 in n1. The formula MPC=MPC+SV is used to obtain the sum of the weighed parameters $w_i$. Moreover, the formula NID=NID+RA is used to obtain the sum of the values RA in the output image data OID.

Whether the value MPC is larger than 1 is determined at step 24. When the value MPC is larger than 1, it represents the sum of the weighed parameters $w_i$ is larger than 1, and the method proceeds to step 25. At step 25, the redundant parts are removed from the values NID to obtain the required output image data OID, and the values OID are output. When the value MPC is not larger than 1, it represents the output image data OID therefore obtained are not required as step 26.

At step 25, formulas RA'=ID*MPC, OID=NID−RA', NID=RA', and OE=1 are executed. The value MPC is always kept to remain smaller than 1. That is, MPC =MPC−1, as MPC>1. The value RA' represents the redundant part such as (1/5)*a2 in Eq.(5). The formula OID=NID−RA, which subtracts the value NID by the redundant part RA' is used to obtain the required output image data OID. As mentioned above, the invention uses the redundant part of one output image data to calculate the next output image data. The formula NID=RA' here is used to keep the redundant part, and the value OE is equal to 1 represents the obtained image data OID can be output.

At step 26, as the value MPC is not larger than 1, the value OE is 0 represents the obtained image data OID are not required, and no parameters are further reset. At last, whether any more input image data are to be sampled is determined at step 27. If there are still input image data to be sampled, the method goes back to step 22 to continue the process mentioned above. Otherwise, the whole process finishes.

Figure 3:
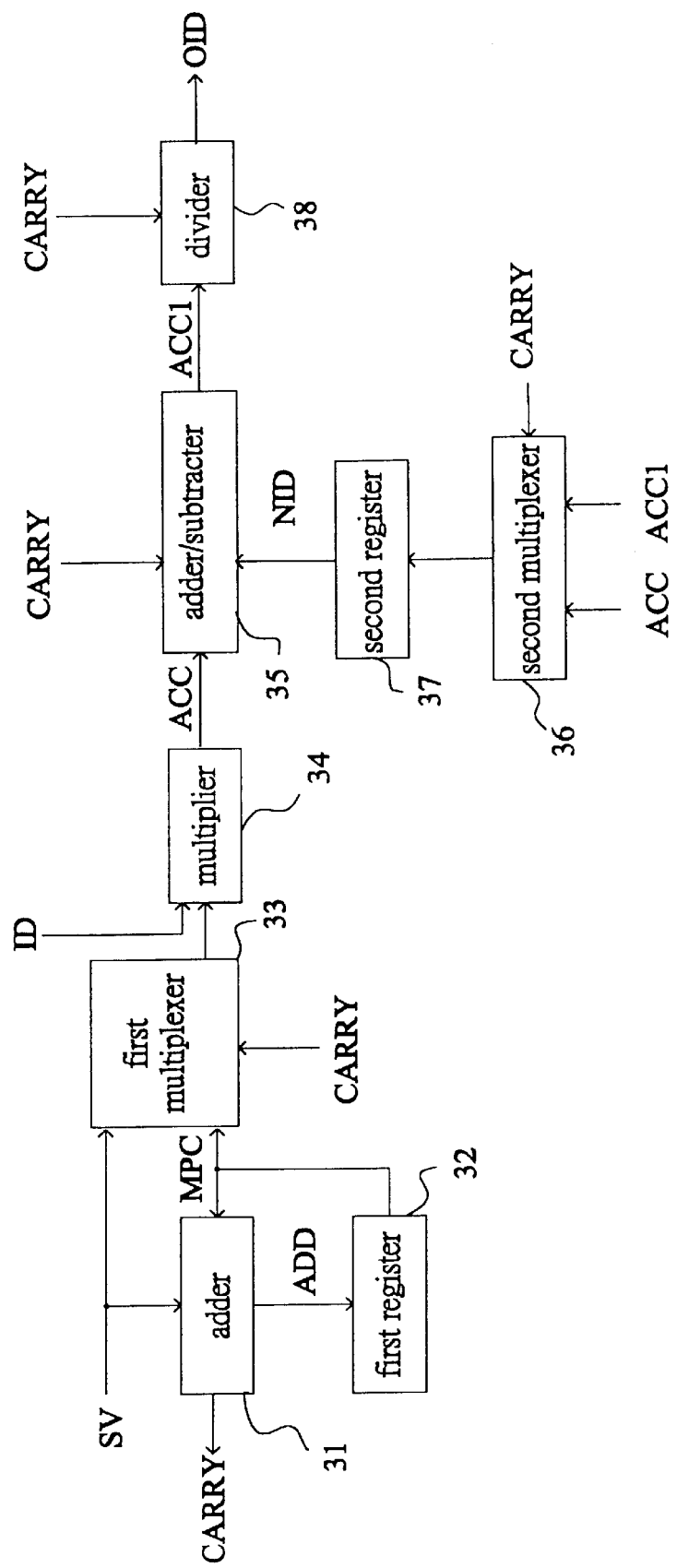
FIG. 3 is a block diagram showing an apparatus of image sampling according to a preferred embodiment of the invention.

Referring to FIG. 3 which is a block diagram showing an apparatus of image sampling according to a preferred embodiment of the invention. The input and output image data are supposed to be 16-bit. However the invention can be applied similarly to process data with other number of bits. FIG. 2 can be referred along with FIG. 3 to obtain a clearer picture. The adder 31 is used to receive the parameters SV, MPC and to output the carry bit CARRY and the value ADD which is the sum of the parameters SV and MPC. The carry bit CARRY has the value 0, or 1. The value CARRY is 0 when the parameter MPC is not large than 1, and the value CARRY is 1 when the parameter MPC is larger than 1. The value ADD is received by the first register 32 which feedbacks the parameter MPC to the first adder 31. The feedback of the parameter MPC is used to operate the formula MPC=MPC+SV.

Parameters SV and MPC are also input to the first multiplexer 33. The first multiplexer 33 outputs the parameter SV or MPC under the control of the carry bit CARRY. When the carry bit CARRY is 0 (i.e. MPC≦1), the first multiplexer 33 outputs the parameter SV. When the carry bit CARRY is 1 (i.e. MPC>1), the first multiplexer 33 outputs the parameter MPC in stead.

The output terminal of the first multiplexer 33 is connected to the multiplier 34. The multiplier 34 receives one of the input image data ID and outputs the parameter ACC. When the carry bit CARRY is 0, the output of the first multiplexer 33 is the parameter SV, and the value ACC is then the product of the values SV and ID. That is, the multiplier 34 executes the formula RA(ACC)=SV*ID. When the carry bit CARRY is 1, the output of the first multiplexer 33 is the parameter MPC, and the value ACC is then the product of the values MPC and ID. That is, the multiplier 34 operates the formula RA'(ACC)=MPC*ID.

The adder/subtracter 35 does the addition or the subtraction of the values ACC and NID under the control of CARRY. The output of the adder/subtracter 35 is another parameter ACC1 or directly one of the output image data OID. When CARRY =0, the adder/subtracter 35 does the addition, and outputs the parameter ACC1. That is, the adder/subtracter 35 performs the formula NID=NID+RA. When CARRY=1, the adder/subtracter 35 does the subtraction, and outputs one of the image data OID. That is, the adder/subtracter 35 performs the formula OID=NID−RA'.

The second multiplexer 36 outputs the parameter ACC or ACC1 under the control of CARRY. When CARRY=0, the second multiplexer 36 outputs the parameter ACC. When CARRY=1, the second multiplexer 36 outputs the parameter ACC1. Besides, the second register 37 receives the output of the second multiplexer 36, and outputs the parameter NID.

The invention further uses a divider 38 to receive the output ACC1 of the adder/subtracter 35. It is supposed that the value is represented by M/N, wherein SV is the simplest fraction. When N=$2^n$(n is a natural number), the divider 38 can be seen as a displacement unit. As shown in FIG. 3, the divider 38 decides whether to deal with the value ACC1 and output the image data OID under the control of CARRY. When CARRY=0, the divider 38 does not output the value OID, and the value ACC1 output by the adder/subtracter 35 is fed back to the second multiplexer 36. When CARRY=1, the divide 38 outputs the image data OID.

In addition, the apparatus shown in FIG. 3 is integrated in the application specific integrated circuit (ASIC) of an image scan system.

FIG. 4a and FIG. 4b show the results of scanning the image curve in FIG. 1a with the formal and non-optical resolution respectively according to the invention. In comparison of FIG. 1c and FIG. 4b, as the sloped straight line L is scanned with the same non-optical resolution, the saw-toothed scan pattern is more indistinct in the invention than that in the art. It means that the better image quality can be reached in the invention.

To sum up, the characteristics of the invention are as follows:

The invention uses the method of approximation and recursion to reduce the saw-toothed scan pattern with the non-optical resolution. Also the sampling process with the non-optical resolution according to the invention is performed in real time, as applied in the digital image scan system. Therefore, no additional algorithm is needed in image scanning and the processing time can be shortened largely.

The invention can be applied in X-axis and Y-axis sampling. In a common scanner, X-axis implies the direction in which the photo sensor (for example, CCD) is arranged, and Y-axis implies the direction in which the photo sensor moves. It is obvious that X-axis and Y-axis are identical.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus of image sampling for processing an input image value to produce an output image value in a digital image scan system, wherein the digital image scan system provides a first parameter, and the first parameter is a ratio of non-optical and formal resolution in the digital image scan system, which comprises:

an adder, for receiving the first parameter and a second parameter, and producing a carry bit and a value;

a first register, for receiving the value, and outputting the second parameter, which is fed back to the adder;

a first multiplexer, for deciding to output the first or the second parameter under the control of the carry bit;

a multiplier, for receiving the input image value and the output of the first multiplexer, and outputting a third parameter;

an adder/subtracter, for doing the addition or the subtraction of the third parameter and a fourth parameter under the control of the carry bit and outputting a fifth parameter;

a second multiplexer, for deciding to output the third or the fifth parameter;

a second register, for receiving the fifth parameter, and outputting the fourth parameter; and a divider, for receiving the output of the adder/subtracter, and outputting the output image value under the control of the carry bit.

2. An apparatus according to claim 1, wherein the divider is a displacement unit when N=$2^n$ (n is a natural number), and N is the denominator of the first parameter.

3. An apparatus according to claim 1, wherein the second parameter is a mapping pixel count.

4. An apparatus according to claim 1, wherein the input image value and the output image value are both 16-bit.

5. An apparatus according to claim 1, wherein the carry bit is 0 when the second parameter is not larger than 1.

6. An apparatus according to claim 1, wherein the carry bit is 1 when the second parameter is larger than 1.

7. An apparatus according to claim 1, wherein the first multiplexer outputs the first parameter when the carry bit is 0.

8. An apparatus according to claim 1, wherein the first multiplexer outputs the second parameter when the carry bit is 1.

9. An apparatus according to claim 1, wherein the first adder/subtracter performs the addition operation when the carry bit is 0.

10. An apparatus according to claim 1, wherein the first adder/subtracter performs the subtraction operation when the carry bit is 1.

11. An apparatus according to claim 1, wherein the second multiplexer outputs the third parameter when the carry bit is 0.

12. An apparatus according to claim 1, wherein the second multiplexer outputs the fifth parameter when the carry bit is 1.

13. An apparatus according to claim 1, wherein the divider deals with the fifth parameter to produce the output image value when the carry bit is 1.

14. A method of image sampling for processing an input image value to produce an output image value in a digital image scan system, wherein the digital image scan system provides a first parameter, and the first parameter is a ratio of non-optical and formal resolution in the digital image scan system, which comprises the steps of:

setting initial values of a second and a third parameters, wherein the second parameter decides a carry bit;

replacing the second parameter by a sum of the first and the second parameters;

inputting the input image value;

obtaining a product of the input image value and the first parameter, and setting the product as a fourth parameter;

obtaining a sum of the third and the fourth parameters, and replacing the third parameter by the sum;

setting a product of the second parameter and the input image value as a fifth parameter, and setting a result of the third parameter subtracted by the fifth parameter as the output image value, and replacing the fifth parameter by the third parameter when the carry bit is a first value; and going back to the step of replacing the second parameter.

15. A method according to claim 14, wherein the carry bit is 0 when the second parameter is not larger than 1.

16. A method according to claim 14, wherein the carry bit is 1 when the second parameter is larger than 1.

17. A method according to claim 14, wherein the second parameter is a mapping pixel count.

18. A method according to claim 14, wherein the input and the output image values are both 16-bit.

19. A method according to claim 14, wherein the initial values of the second and third parameters are both 0.

20. A method according to claim 14, further comprising the step of outputting the output image value when the second parameter is larger than 1.

21. A method according to claim 14, wherein the first value is 1.

* * * * *